Nov. 8, 1932.     C. C. CADDEN     1,886,639
METHOD AND APPARATUS FOR MAKING HOSE
Filed July 26, 1929     3 Sheets-Sheet 1
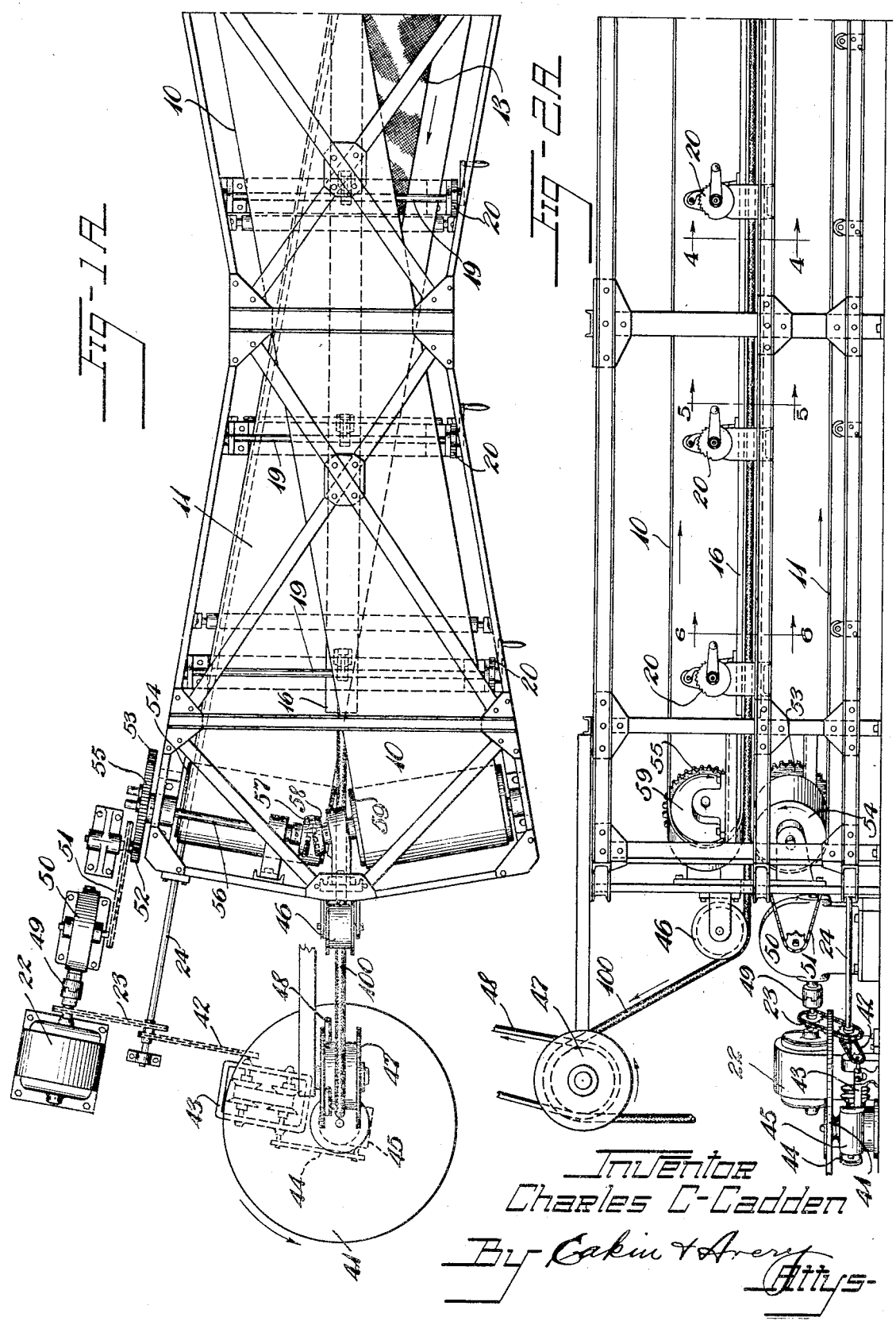
Inventor
Charles C. Cadden
By Eakin & Avery
Attys

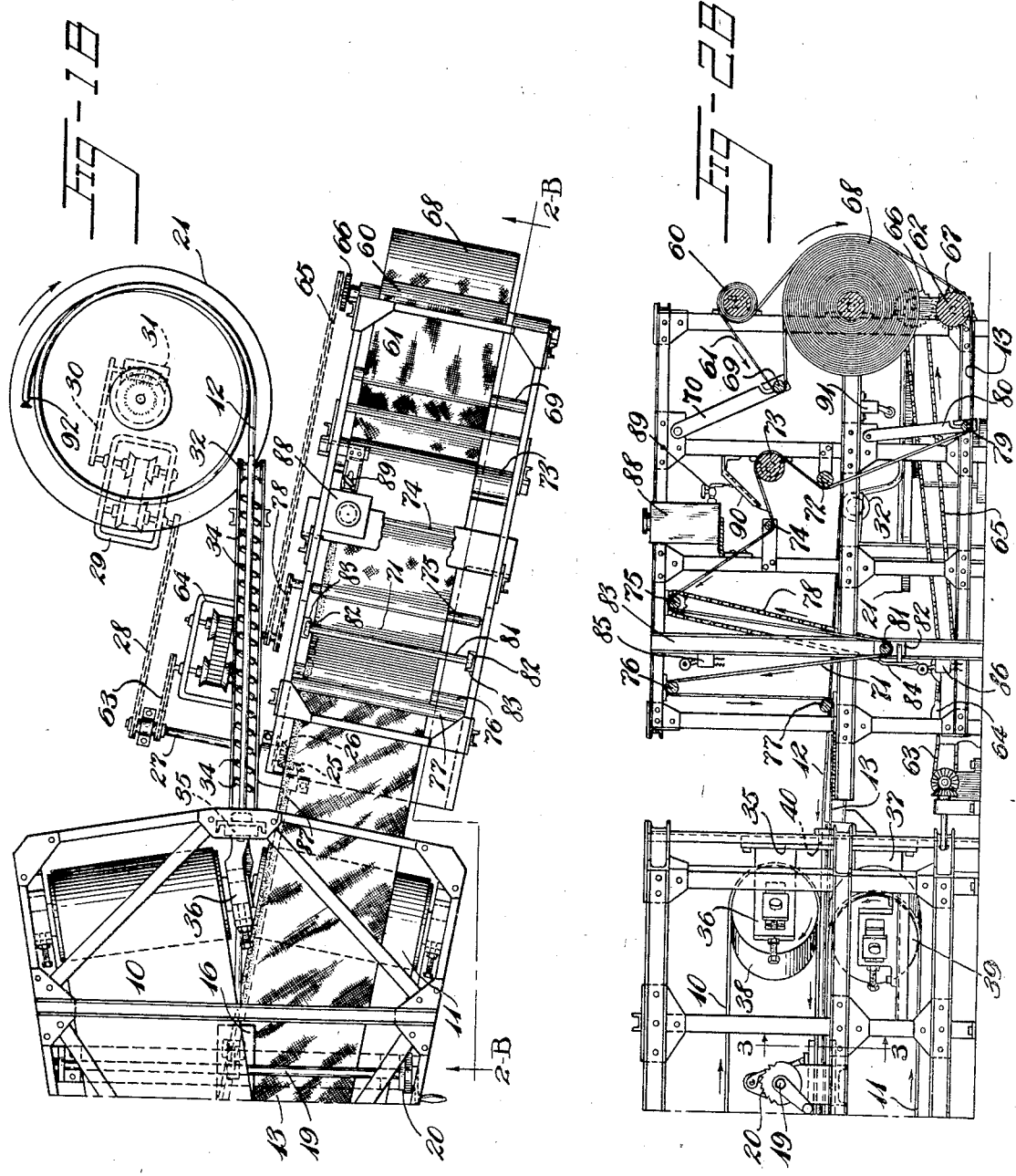

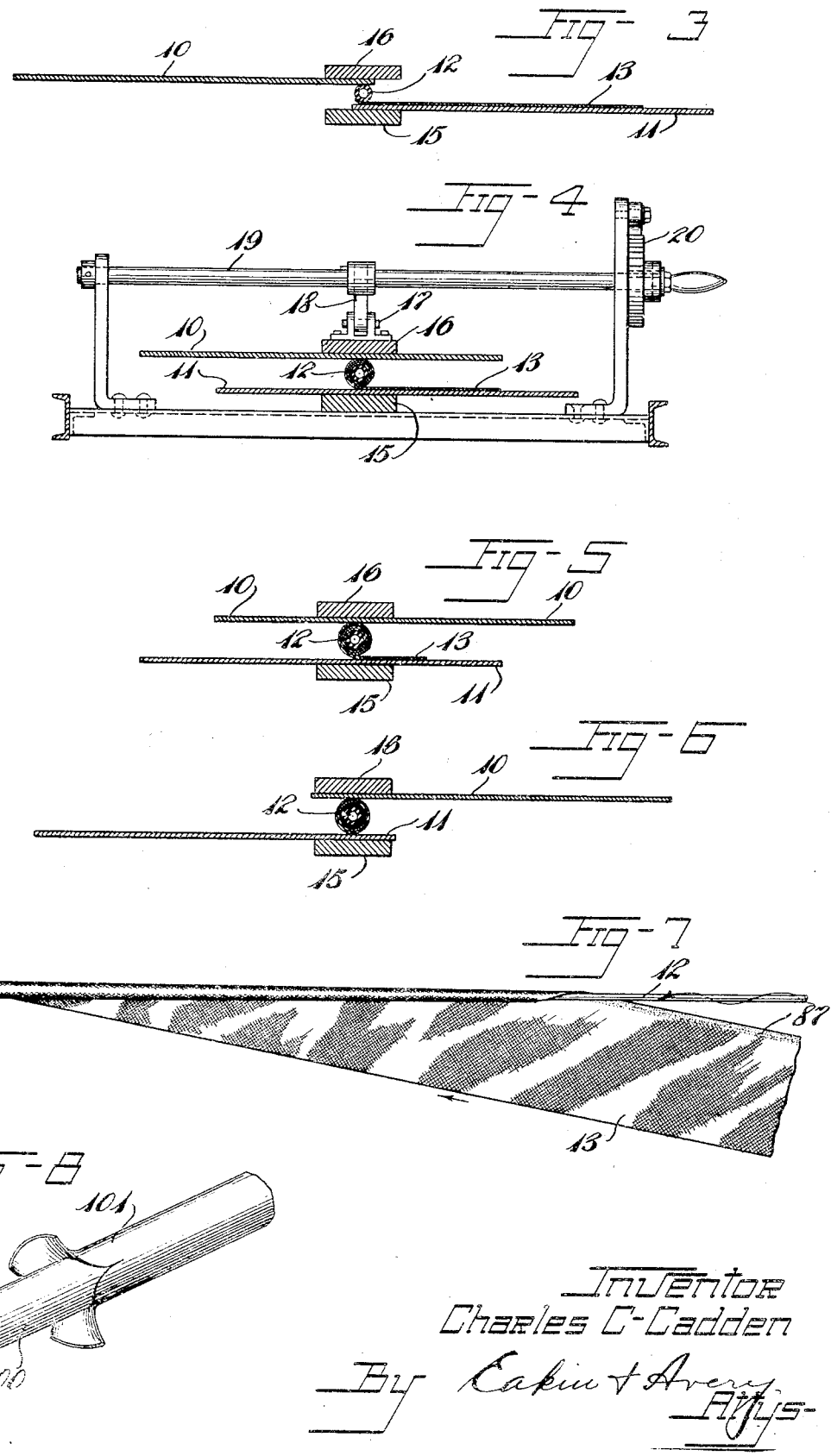

Patented Nov. 8, 1932

1,886,639

UNITED STATES PATENT OFFICE

CHARLES C. CADDEN, OF AKRON, OHIO, ASSIGNOR TO THE B. F. GOODRICH COMPANY, OF NEW YORK, N. Y., A CORPORATION OF NEW YORK

METHOD AND APPARATUS FOR MAKING HOSE

Application filed July 26, 1929. Serial No. 381,318.

This invention relates to methods and apparatus for making conducting hose, and its chief objects are to provide an improved hose of the wrapped type, to provide improved procedure and apparatus for making such hose, to provide improved quality in the hose in conjunction with economy of manufacture, and especially to provide for convenient and economical manufacture of hose in longer lengths than it has been practicable heretofore to manufacture.

Prior to my invention, so far as I am aware, the common commercial practice in the manufacture of wrapped hose has involved the wrapping of rubberized fabric upon a mold or mandrel and vulcanizing the hose in a pressure fluid while it remains upon the mandrel. In this practice only comparatively short lengths of hose can be made, the mandrels are a matter of expense and require laborious handling, and the product has had the disadvantage that the tension of one convolution of fabric has been modified by the winding on of a later-wound convolution and the relative conditions of stretch in the several convolutions in the finished hose have not been accurately coordinated for attainment of the desired condition that the stretch of each added ply be slightly greater than that of the next preceding ply so as to give the full strength of all plies against bursting strains notwithstanding the geometrical fact that the inner plies are subjected to a greater percentage of stretch than the outer plies are in the expansion of the hose in service.

I obviate these disadvantages and attain the above stated objects by applying a wrapping of fabric to the rubber lining-tube of the hose by progression lengthwise thereof, preferably without the use of a mandrel, and vulcanizing the wrapped hose in a mold under internal fluid pressure, whereby the tube wall is compacted by the internal pressure and the fabric is given a desirable amount of stretch which under certain conditions may be brought to a closer approximation of the desired graduation of the stretch from the innermost to the outermost ply than heretofore has been obtained.

Of the accompanying drawings:

Figs. 1A and 1B together constitute a plan view of apparatus embodying and adapted to carry out my invention in its preferred form.

Figs. 2A and 2B together constitute a side elevation of parts of the apparatus, other parts being shown in vertical section on line 2b—2b of Fig. 1B.

Fig. 3 is a section on line 3—3 of Fig. 2B.
Fig. 4 is a section on line 4—4 of Fig. 2A.
Fig. 5 is a section on line 5—5 of Fig. 2A.
Fig. 6 is a section on line 6—6 of Fig. 2A.
Fig. 7 is a plan view of the lining-tube and a strip of fabric being wrapped thereon, illustrating, apart from the apparatus, the manner in which the work is manipulated by the apparatus.

Fig. 8 is a perspective view of the wrapped hose structure within a lead sheath in which it is vulcanized under internal fluid pressure.

Referring to the drawings, the apparatus comprises an upper endless belt 10 and a lower endless belt 11 obliquely crossed with relation to each other as viewed in plan (Figs. 1A and 1B), the lower reach of the upper belt and the upper reach of the lower belt being adapted to embrace between them a hose lining-tube 12 (see Fig. 3) and a strip 13 of rubberized hose fabric to be wound thereon, the fabric being fed onto the belt 11 in parallel relation thereto, and to effect a wrapping of the fabric onto the hose lining in a plurality of superposed convolutions, as shown in Figs. 3 to 7, as the work-contacting reaches of the two belts are driven in the same direction, to the left in Figs. 1A and 1B, the oblique relation of the belts causing them to rotate the hose lining upon its own axis while permitting it to be drawn continuously in the same straight line through the apparatus and the belt 11 supporting the unwound part of the fabric strip in spread condition and without sliding of the fabric thereon while the fabric is being wound upon the hose lining (Figs. 3 to 7).

As is shown clearly in Fig. 7, the fabric is applied to the hose lining in a plurality of superposed convolutions by progression lengthwise of the hose and although the product is virtually a straight-wrapped hose the process may be continuous for extremely long lengths of hose.

Still referring to Figs. 3 to 7, the upper reach of the lower belt 11 slides upon and is supported against the downward course of the work by a flat rail 15 mounted upon the framing of the machine and the lower reach of the upper belt 10 slides in contact with and is held downward against the work by a flat hold-down rail 16 which at several positions along its length is hinged as at 17, Fig. 4, to the outer ends of arms 18 secured upon respective shafts 19, 19 which are journaled in the framing of the machine and are provided with respective ratchet and pawl devices 20, 20 for holding them in rotative position such as to hold the rail 16 downward against the lower reach of the upper belt 10, the individual ratchet and pawl devices 20 for the several shafts 19 permitting the adjustment of the hold-down rail 16 at different positions along its length to be such as to allow for the increasing diameter of the hose structure as successive convolutions of the fabric are wound thereinto.

Since the portion of the work engaged by the belts is continuously rotated upon the axis of the lining-tube, it is highly desirable that the supply of the lining-tube be correspondingly rotated, and for supporting the supply and giving it such rotation as to permit the lining-tube to pass to the wrapping position without substantial torsion, a turntable 21 (Figs. 1B and 2B) is mounted on a vertical axis in position to give off the lining-tube to the wrapping apparatus and is adapted to be driven from a motor 22 (Figs. 1A and 2A) through a sprocket chain 23, shaft 24, bevel gears 25, 26, shaft 27, sprocket chain 28, variable speed device 29, sprocket chain 30 and worm gearing 31.

For assisting in feeding the hose-lining 12 upward from the turntable 21 and guiding it into alignment with the wrapping position, a waisted guide roller 32 is journalled in suitable framing.

Between the roller 32 and the belts the hose-lining is supported by a series of small cylindrical idler rolls 34, 34 journaled in the framing upon horizontal axes disposed obliquely to the path of travel of the hose-lining so that the latter, rotating as it moves forward, will nevertheless keep to its straight path of travel and not roll laterally out of alignment as it would do if the axes of the rolls 34, 34 were at right angles to its path of travel.

To maintain the hose-lining 12 accurately in alignment as it passes to the belts, a bracket 35 secured to the framing and having journal arms 36, 37 for the adjacent end rolls 38, 39 of the endless belts is formed with a guide aperture 40 (Fig. 2B) through which the hose-lining 12 is threaded.

It is also desirable that the accumulating supply of the completed product be rotated consistently with the rotation of the work in the wrapping operation, as it is preferred not to put the wrapped structure under great torsional strain, and for receiving and so rotating the wrapped hose structure as it is delivered from the endless belts a turntable 41 is mounted upon a vertical axis and is adapted to be driven from the motor 22 through the sprocket chain 23 running to the shaft 24 and through a sprocket chain 42, variable speed device 43, sprocket chain 44, and worm gearing 45.

For drawing the wrapped hose structure, 100, from the endless belts, past a guide roller 46, and feeding it onto the turntable 41, an over-speed sheave 47 is journaled in the framing over the turntable and is adapted to be driven at a speed slightly faster than that at which the hose structure is delivered from the belts, by a drive belt 48 running from an overhead sheave (not shown).

The lower wrapping belt 11 is adapted to be driven from the motor 22 through a jaw clutch 49, reduction gear 50, a sprocket chain 51, gear 52, and a gear 53 secured upon the trunnion of the adjacent end roller 54 of the belt and for driving the upper wrapping belt 10 at the same speed a gear 55 secured upon a shaft 56 is meshed with the gear 53, and the shaft 56 has drive connection through a pair of bevel gears 57, 58 with the adjacent end roller 59 of the upper belt.

For supplying the fabric strip 13, a stock roll 60 of the fabric interwound with a liner 61 is journaled upon the framing as shown clearly in Fig. 2B and a pull-off roll 62 is journaled in the framing and adapted to be driven from the shaft 27 through a sprocket chain 63, variable speed device 64, sprocket chain 65, and gears 66, 67 to withdraw the fabric strip from the roll 60 and over a liner rewinding roll 68 to rewind the liner 61, which passes about a floating tension roll 69 mounted in a pair of pivoted weight arms such as the arm 70, in passing from the stock roll 60 to the liner rewinding roll 68. For guiding the fabric strip 13 from the pull-off roll 62 onto the lower wrapping belt 11, through a reserve loop 71, rolls 72, 73, 74, 75, 76, and 77 are journaled in the frame of the machine and the roll 75 is adapted to be driven from the variable speed device 64 through a sprocket chain 78, and a tension roll 79 mounted between a pair of weight arms such as the weight arm 80 is mounted between the pull-off roll 62 and the guide roll 72.

Mounted in the reserve loop 71 of the fabric strip is a floating roll 81 having its ends journaled in slide blocks 82, 82 slidably mounted in respective vertical guides 83, 83, and one of the blocks is provided with a contact shoe 84 adapted to actuate an automatic stop device 85 when the reserve loop becomes very short, and to actuate an automatic stop device 86 when the reserve loop becomes very long, to stop the entire apparatus and permit the operator to adjust the variable speed device 64 appropriately.

For a similar purpose an automatic stop device 91 is mounted upon the frame in position to be engaged by one of the weight arms 80 when the weight arm is lifted by excessive tension in the fabric strip 12 adjacent the pull-off roll 62.

For applying a zone of rubber cement 87 (Fig. 7) to the margin of the fabric strip 13 which is to be first applied to the lining-tube 12, to cause it to adhere firmly thereto, the guide rolls 73, 74 (Fig. 2B) are so positioned as to support between them an approximately horizontal reach of the fabric, and a cement can 88 provided with a drip cock 89 is mounted in position to continuously deliver a small stream or succession of drops of cement into a cement chute 90 mounted upon the framing and positioned with its lower end directly over the path of the adjacent margin of the fabric, so as to deliver the cement onto the said margin.

In producing the wrapped hose structure by means of apparatus described, the lining-tube 12 permissibly in a very long length, is preferably filled with air under a sufficient pressure to prevent excessive flattening of the tube by the pressure of the wrapping belts, the tube being coiled upon the turntable 21 and its ends closed and tied as shown at 92 (Fig. 1B) to retain the air.

The leading end of the tube is then passed over the guide roll 32 and the series of oblique rolls 34 and through the guide aperture in the bracket 35 and is started between the wrapping belts, and the fabric strip 13 is suitably threaded through the series of guiding and driving rolls as shown in Fig. 2B and is started upon the upper reach of the lower wrapping belt 11.

The drive mechanism being in suitable adjustment, the drive of the machine is started and the hose-lining 12 embraced between the wrapping belts is carried forward by them in a straight line and rotated on its own axis so that it picks up the fabric strip 13 from the belt 11 in a plurality of superposed convolutions as the result of the progressive overlapping of the converging reaches of the belts moving toward the delivery end of the machine, without substantial sliding of the fabric with relation either to the belt 11 upon which it is supported or with relation to the upper belt 10.

As the wrapped hose structure 100 emerges from the delivery end of the wrapping apparatus it is passed over the sheave 47 by hand and started in a coil upon the receiving turntable 41, which continues to receive it and to rotate it in proper relation to its rotation at the wrapping position.

The operation of the machine is then automatic until the entire length of the lining-tube has been wrapped and delivered onto the turntable 41.

The length of wrapped hose structure is then vulcanized, preferably under internal fluid pressure and while mounted within a confining mold structure, such as the lead sheath 101, Fig. 8, which may be applied by passing the hose structure through a lead press (not shown) such as has been commonly used in applying a lead covering to braided hose heretofore to restrain the hose against internal fluid pressure in the vulcanizing operation, and after vulcanization the lead cover or other mold structure is removed from the vulcanized hose in accordance with the prior braided-hose procedure.

In the vulcanizing operation, the hose is expanded within the mold structure and in the case of a lead sheath the sheath itself may yield slightly and permit a corresponding enlargement of the hose, and in the expansion of the hose in the mold structure the fabric wrapping expands by stretch and under certain conditions, as when a fabric is used which is sufficiently resistant to the stretching force and the lead sheath is of such moderate thickness as to expand substantially under the force of the distending fluid, the fabric wrapping may expand partly by an uncoiling of the spiral wrapping. As the sliding of one ply upon another, which is an incident of such uncoiling, is resisted by a frictional drag which is very slight as to the inner plies but is progressively greater toward the outer plies because of the cumulative effect of the drag, the expansion of the inner plies is effected more largely by slippage than is that of the outer plies, with the result that the outermost ply is the most stretched and the stretch of the plies is progressively less toward the innermost ply.

As a result, the inner plies of a hose so built have a reserve stretchability in the finished hose such that, although they are given a greater percentage of stretch in the expansion of the hose in service, they will reach their maximum limit of stretch at about the same time that the outer plies do, so that the full strength of all plies will be available against bursting of the hose, and the progressive increase of the stretch from the inner to the outer ply in the molding operation is such that the graduation closely approximates the ideal, the softening of the rubber during vulcanizing permitting relaxation of excessively high local strains in the fabric and such uncoiling of the fabric or slippage of ply on ply, but only such, as to give approximately the desired ratio of strains in the several plies of the finished product.

Modifications are possible within the scope of my invention as defined in the appended claims.

I claim:

1. The method of making a hose which comprises distending a lining-tube by internal fluid pressure and wrapping fabric thereon while it is so held distended and while feeding the lining tube in a straight path inclusive of the wrapping position.

2. The method of making hose which comprises feeding a lining-tube longitudinally while rotating it on its longitudinal axis throughout its length and feeding a strip of fabric obliquely onto the hose-lining at an acute angle to the latter's axis to wrap the single strip of fabric laterally of the fabric strip onto the lining-tube in a plurality of superposed convolutions.

3. The method of making hose which comprises feeding a lining-tube longitudinally from a supply coil into a receiving coil while rotating on its longitudinal axis the portion being so fed and so rotating the said coils as to avoid excessive twisting of the lining-tube and while feeding a strip of fabric obliquely onto the lining-tube at an acute angle to the latter's axis to wrap the single strip of fabric laterally of the fabric strip onto the lining-tube in a plurality of superposed convolutions.

4. The method of making hose which comprises feeding a lining-tube longitudinally from a supply while rotating on its longitudinal axis the portion being so fed and so rotating the said supply as to avoid excessive twisting of the lining-tube and while feeding a strip of fabric obliquely onto the lining-tube at an acute angle to the latter's axis to wrap the single strip of fabric laterally of the fabric strip onto the lining-tube in a plurality of superposed convolutions.

5. The method of making hose which comprises feeding a lining-tube longitudinally without substantial twisting thereof while feeding a strip of fabric onto the lining-tube and wrapping the single strip of fabric laterally of the fabric strip about the lining-tube in a plurality of superposed convolutions.

6. The method of making hose which comprises feeding a strip of fabric longitudinally from a supply and wrapping it laterally upon itself in a plurality of superposed convolutions by progression lengthwise of the strip while maintaining the wrapped portion in substantially cylindrical form and without substantial twisting of the wrapped fabric.

7. Hose making apparatus comprising means for feeding a lining-tube longitudinally and rotating it upon its longitudinal axis throughout its length while it is so fed and means for feeding a strip of fabric obliquely onto the lining-tube at an acute angle to the latter's axis to cause the single strip of fabric to be wrapped laterally of the fabric strip onto the lining tube in a plurality of superposed convolutions.

8. Apparatus as defined in claim 7 in which the lining-tube feeding and rotating means comprises a pair of endless belts disposed at an angle to each other and so constructed and arranged as to embrace the work between them.

9. Apparatus of the character described comprising means for feeding work of cylindrical form longitudinally and rotating the same, said means including a pair of endless belts disposed at an angle to each other and adapted to embrace the work between them.

10. Apparatus of the character described comprising means for feeding work of cylindrical form longitudinally and rotating the same, said means including a pair of endless belts disposed at an angle to each other and adapted to embrace the work between them and backing means for holding the adjacent, work-contacting reaches of the belts against the work.

11. Hose-making apparatus comprising means for feeding a tube longitudinally and rotating it upon its longitudinal axis and means for supporting a supply of the tube and so rotating it as to avoid excessive twisting of the tube as it passes from the said supply to the said tube-rotating means.

12. Hose-making apparatus comprising means for feeding a tube longitudinally and rotating it upon its longitudinal axis, means for supporting a supply of the tube and so rotating it as to avoid excessive twisting of the tube as it passes from the said supply to the said tube-rotating means, and means for receiving an accumulation of material comprising the tube from the said tube-feeding means and so rotating it as to avoid excessive twisting of the tube.

13. Apparatus of the character described comprising means for feeding a flexible cylindrical member longitudinally and rotating it upon its longitudinal axis and rotary means for supporting a portion of the said member passing to the said feeding and rotating means, the said rotary means being journaled on an axis oblique to the path of movement of the adjacent portion of the said member to rotate therewith and to permit the said portion of the flexible member to rotate on its longitudinal axis without excessive lateral displacement.

14. Apparatus of the character described comprising means for longitudinally feeding a cylindrical member and rotary means for supporting the same while it is so fed, the said rotary means being journaled on an axis oblique to the path of movement of the cylindrical member to permit the latter to rotate on its longitudinal axis without excessive lateral displacement.

15. Hose making apparatus comprising means for feeding a tube longitudinally and rotating it upon its longitudinal axis and means for receiving an accumulation of material comprising the tube from the said tube-feeding means and so rotating it as to avoid excessive twisting of the tube.

16. The method of making hose which comprises feeding a lining tube longitudinally past a wrapping position and there rotating a portion of the tube on its longitudinal axis to wrap a strip of material thereon, while effecting rotation of an incoming portion of said tube by applying a rotative force thereto at a position other than the wrapping position to avoid excessive twisting of the tube.

17. Hose making apparatus comprising means for feeding a tube longitudinally past a wrapping position and there rotating a portion thereof on its longitudinal axis to wrap a strip of material thereon, and means for rotating an incoming portion of the tube to avoid excessive twisting thereof.

18. The method of making hose which comprises feeding a lining tube past a wrapping position and there rotating a portion of the tube on its longitudinal axis to wrap a strip of material thereon, while effecting rotation of an outgoing portion of said tube by applying a rotative force thereto at a position other than the wrapping position to avoid excessive twisting thereof.

19. Hose making apparatus comprising means for feeding a tube longitudinally past a wrapping position and there rotating a portion of the tube on its longitudinal axis to wrap a strip of material thereon, and means for rotating an outgoing portion of the tube to avoid excessive twisting thereof.

20. The method of making hose which comprises feeding a strip of fabric longitudinally from a supply and wrapping it laterally upon a tube in a plurality of superposed convolutions by progression lengthwise of the strip, while rotating upon its longitudinal axis the portion of the tube being wrapped and feeding the tube in a straight line through its position of initial contact with the fabric to a position where it is completely fabric-wrapped.

21. Hose making apparatus comprising means for feeding a tube longitudinally past a wrapping position and there rotating a portion thereof on its longitudinal axis to wrap a strip of material thereon, and guide means in association with said feeding and rotating means for feeding the tube in a straight line through its position of initial contact with the wrapping material to the end of the wrapping position.

In witness whereof I have hereunto set my hand this 20th day of July, 1929.

CHARLES C. CADDEN.